UNITED STATES PATENT OFFICE.

ISIDORE McCORMACK, OF NEW ORLEANS, LOUISIANA.

IMPROVEMENT IN THE MANUFACTURE OF FUEL FROM COAL WASTE OR SLACK.

Specification forming part of Letters Patent No. 152,395, dated June 23, 1874; application filed June 19, 1874.

*To all whom it may concern:*

Be it known that I, ISIDORE McCORMACK, of New Orleans, in the parish of Orleans and State of Louisiana, have invented certain new and useful Improvements in the Manufacture of Fuel from Coal Waste or Slack; and I do hereby declare that the following is a full, clear, and exact description thereof, which will enable others skilled in the art to which it pertains to make and use the same.

My invention relates to the utilization of coal waste or dust into a mass suitable for fuel; and it is one of the objects of my invention to treat and solidify the coal dust or slack from the mines and convert it into convenient fuel form without any previous preparation or expensive processes, but combine the particles of coal waste and slack mixed with a certain proportion of clay or loam by means of crude turpentine, which, in its natural gummy state as it exudes from the tree, combines in itself both the fluid and the gum to make the paste and give adhesion as well as a highly-combustible character to the mass, so that the liquid used to effect the mixture and union of the particles of earth and coal-dust is in the simplest and cheapest form for the purpose as it comes from the tree; and possesses the several properties of the necessary adhesion to unite and hold the fine particles in mass, and the property of burning rapidly and with intense heat, and thus having the advantage of not only cheapening the product, but giving it sufficient tenacity to hold the mass intact for convenient use.

The fluid is in fact and effect a natural inflammable and adherent, and only requires to be mixed with the earth and coal in the simplest manner to give the mass a proper consistency. This is done by mixing the earth and coal-dust into the trough or vat containing the gummy turpentine, and stirring it until it becomes thick and will no longer absorb the dry material.

In this operation the particles of the coal-waste and earth are thoroughly incorporated with each other and adhere by the gummy character of the mixing element, so that the mass becomes adhesive without the addition of separate expensive ingredients to produce such adhesion of the particles.

The earth is mixed in a proportion of about one-third to two-thirds of coal-dust, and with turpentine sufficient to solidify the mass; because, as the mixture and adhesion are only mechanical, it is only necessary to add earth and coal-dust until the mass is converted from a semi-liquid to a condition that will hold together and admit of its being handled as a solid fuel with convenience.

It is the design to obtain, by the simplest process and combination of elements, an artificial fuel, of which coal-dust is the base, and I prefer to accomplish this by the combination stated; but if it be found desirable, I may add such other agents as will cause greater intensity of combustion in the fuel—viz., a combination of sulphate of soda (Glauber's salts) and carbonate of lime, or a solution of carbonate of soda, or a preparation of carbonate of lime, or any substance of similar properties.

In carrying out my invention it is not essential to form the fuel that loam or clay be used, as the crude turpentine with the coal-dust alone will answer the purpose of an adhering paste for the powder.

I claim—

1. The combination, in an artificial fuel, of coal waste or slack, crude turpentine, and loam or clay, mixed together until the solids are united into a mass.

2. An artificial fuel of coal-waste and loam or clay solidified by a paste of crude turpentine, combining in itself the requisites both of adhesion and inflammability.

3. The combination, in an artificial fuel, of crude turpentine with coal waste or slack, as described.

In testimony that I claim the foregoing I have affixed my signature in the presence of two witnesses.

ISIDORE McCORMACK.

Witnesses:
A. E. H. JOHNSON,
J. W. HAMILTON JOHNSON.